B. HOFER.
APPARATUS FOR SEPARATING SOLID MATTER, MORE PARTICULARLY CELLULAR MATTER, FROM LIQUIDS.
APPLICATION FILED APR. 22, 1914.
1,108,095. Patented Aug. 18, 1914.
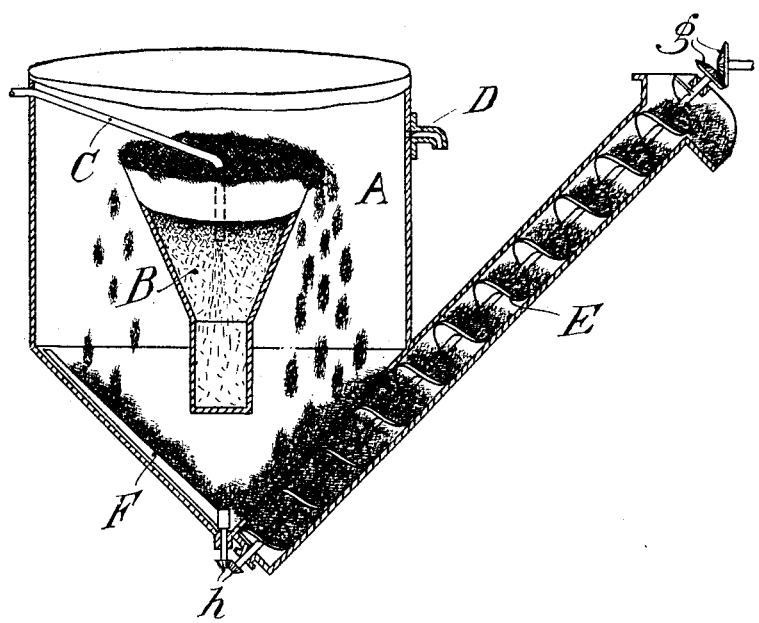
Witnesses:
Judith Pardee
Clarice Franck
Inventor
Bruno Hofer
by his Attorney

UNITED STATES PATENT OFFICE.

BRUNO HOFER, OF MUNICH, GERMANY.

APPARATUS FOR SEPARATING SOLID MATTER, MORE PARTICULARLY CELLULAR MATTER, FROM LIQUIDS.

1,108,095.  Specification of Letters Patent.  Patented Aug. 18, 1914.

Application filed April 22, 1914. Serial No. 833,609.

*To all whom it may concern:*

Be it known that I, BRUNO HOFER, citizen of Germany, residing at Munich, Bavaria, Germany, have invented certain new and useful Improvements in Apparatus for Separating Solid Matter, More Particularly Cellular Matter, from Liquids; and I do hereby declare the following to be a full, clear, and exact description of the invention, such as will enable others skilled in the art to which it appertains to make and use the same.

My invention relates to apparatus for separating solids from liquids, and has particular reference to an apparatus by means of which cellular fibrous matter may be separated from liquids, such as the waste water from paper mills.

The principal object of the invention is to provide a simply constructed device, which will operate efficiently to separate solid matter, such as cellular fibrous matter, from liquids containing the same.

A preferred embodiment of the invention is shown in the accompanying drawing, wherein the figure is a vertical sectional view.

Referring to the drawing by reference characters, A denotes a large container, which may, for example, for the purpose of separating cellular matter from the waste water of a paper factory, be placed under ground so that the waste water from the paper machine flows directly into the container, without the aid of a pump or the like. In this container, there is a casing B which gradually expands toward the top and is preferably closed at the bottom as shown in the drawing. The pipe C supplying the waste water extends as shown in the drawing to about the middle of the casing B. The container A is provided at D with a discharge conduit and also has a worm, bucket apparatus or the like E, for removing the separated matter or cellular fibers. The container A is preferably funnel shaped at the bottom so that the separated matter or cellular fibers accumulate in a layer approximating to the slope of the funnel. To prevent adherence of this matter to the bottom of the funnel, a scraper F is preferably provided which is slowly rotated by suitable means and conveys the separated matter or cellular fibers to the worm E. The actuation of this scraper F may, for example, be effected by a spindle of the worm E and small bevel wheels $g$, $h$ or by other suitable means.

The operation of the apparatus described above is as follows:—Before starting work, the container A is filled with ordinary water and then the supply pipe C is opened, the said pipe C supplying the waste water containing the particles to be separated, that is to say, the cellular fibers. This waste water first mixes with the water in the casing B and the particles to be separated, that is to say, the cellular fibers are uniformly distributed in the lower part of the casing B, the waste water running in regularly, causes the layer of fiber or other particles to rise in the casing B, the velocity of the movement being gradually reduced, owing to the fact that the cross section of the casing increases toward the top; consequently the cellular fibers or the like also become dense in the upper layers in the casing. The water flowing through the pipe C is under considerable pressure or head, and has a whirling upward tendency in the casing B. There is thus a circulation of water in this casing, the water carrying the fibrous matter along with it, which results in the gradual ascent, within the casing, of the fibrous particles. This operation continuing during the inflow of the waste water causes the uppermost layer of fibers to be condensed by the fibrous particles moving upwardly from below, whereby this layer gradually rises until the upper parts thereof reach the top edge of the casing B. As the cellular particles or the like are specifically heavier than the liquid, the said particles are then forced over the edge of the casing B and slowly descend through the outer stationary liquid layer to the funnel shaped bottom of the container A. If the edge of the casing B is not horizontal but is provided with a lip or slightly sloping as shown in the drawing the greater part of the cellular layer will pass out over the lowest part of the edge. This lowest part is preferably arranged on the same side as the worm E as shown in the drawing. The particles of cellular matter or the like which accumulate on the funnel shaped floor of the container A in the manner described are conveyed upward by the worm E, for example, in the form of a pasty mass and may then be subjected to further treatment. As above stated the scraper F prevents adherence of separated matter to the floor of the container A. The waste water clarified in this way and freed from admixtures flows through the conduit D out of the container A. It is always important that the separation takes place principally in the casing B from the bottom to the top and over the upper edge of the casing B.

The apparatus described is not only comparatively cheap and simple to manufacture, but a pump or the like may be dispensed with if it is placed sufficiently low for the waste water to flow in by gravity. It is also important that the layers of cellular matter or the like separated in the casing B automatically force each other upward and pass regularly out of the casing B into the container A so that coagulation and decomposition of such layers cannot take place.

Having thus described my invention what I claim as new and desire to secure by Letters Patent is:—

1. In apparatus for separating solids from liquids, the combination with a container having its upper end open and its lower portion substantially funnel-shaped, of a casing in said container, said casing comprising a lower cylindrical portion closed at one end and an upper frusto-conical portion open at both ends and in communication with said cylindrical portion, means for discharging liquids and solids admixed to said casing at a point intermediate its ends, and means for conveying solids out of the funnel-shaped portion of said container.

2. In apparatus for separating solids from liquids, the combination with a container, of a casing in said container gradually increasing in diameter toward its upper end and having said upper end provided with a lip, means for feeding liquids and solids admixed to the interior of said casing at a point intermediate its ends whereby the solids will rise in the casing and flow over said lip, and a conveyer in communication with the interior of said container and adapted to receive the solid matter passing over the lip of the casing.

3. In apparatus for separating solids from liquids, the combination with a container, of a casing in said container gradually increasing in diameter toward its upper end and having said upper end provided with a lip, means for feeding liquids and solids admixed to the interior of said casing at a point intermediate its ends whereby the solids will rise in the casing and flow over said lip, a conveyer in communication with the interior of said container and adapted to receive the solid matter passing over the lip of the casing, a scraper operable on the floor of said container, and means whereby said scraper is driven in synchronism with said conveyer.

In testimony whereof I hereunto affix my signature in the presence of two witnesses.

BRUNO HOFER.

Witnesses:
A. U. W. CAJE,
V. ROEDER.

Copies of this patent may be obtained for five cents each, by addressing the "Commissioner of Patents, Washington, D. C."